US011955633B2

(12) United States Patent
Shen et al.

(10) Patent No.: US 11,955,633 B2
(45) Date of Patent: Apr. 9, 2024

(54) POSITIVE ELECTRODE MATERIAL AND PREPARATION METHOD AND USAGE THEREOF

(71) Applicant: CONTEMPORARY AMPEREX TECHNOLOGY CO. LIMITED, Ningde (CN)

(72) Inventors: Chongheng Shen, Ningde (CN); Rui Du, Ningde (CN); Yongchao Liu, Ningde (CN); Deyu Zhao, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 161 days.

(21) Appl. No.: 17/517,958

(22) Filed: Nov. 3, 2021

(65) Prior Publication Data

US 2022/0059837 A1 Feb. 24, 2022

Related U.S. Application Data

(63) Continuation of application No. PCT/CN2020/084339, filed on Apr. 11, 2020.

(30) Foreign Application Priority Data

Jun. 28, 2019 (CN) ......................... 201910578163.0

(51) Int. Cl.

| | |
|---|---|
| ***H01M 4/525*** | (2010.01) |
| ***H01M 4/36*** | (2006.01) |
| ***H01M 4/505*** | (2010.01) |
| *H01M 4/02* | (2006.01) |

(52) U.S. Cl.

CPC ........... *H01M 4/525* (2013.01); *H01M 4/366* (2013.01); *H01M 4/505* (2013.01); *H01M 2004/028* (2013.01)

(58) Field of Classification Search

None

See application file for complete search history.

(56) References Cited

U.S. PATENT DOCUMENTS

| | | | | |
|---|---|---|---|---|
| 4,980,080 | A | 11/1990 | Lecerf et al. | |
| 6,037,095 | A * | 3/2000 | Miyasaka ............. | H01M 4/485 429/231.95 |
| 2009/0004097 | A1 | 1/2009 | Jung et al. | |
| 2009/0166187 | A1 | 7/2009 | Nagase et al. | |
| 2015/0162598 | A1* | 6/2015 | Kim ........................ | H01M 4/62 429/231.1 |
| 2018/0006302 | A1 | 1/2018 | Li et al. | |

FOREIGN PATENT DOCUMENTS

| | | | |
|---|---|---|---|
| CN | 1356737 | A | 7/2002 |
| CN | 1218417 | C | 9/2005 |
| CN | 101495666 | B | 9/2012 |
| CN | 104704658 | A | 6/2015 |
| CN | 105938917 | A | 9/2016 |
| CN | 108346797 | A | 7/2018 |
| CN | 109786730 | A | 5/2019 |
| JP | H09270260 | A | 10/1997 |
| JP | 2014010909 | A | 1/2014 |
| JP | 2014010909 | A1 | 1/2014 |
| JP | 2015159043 | A | 9/2015 |
| WO | 2019/112097 | A1 | 6/2019 |

OTHER PUBLICATIONS

First Office Action for counterpart application CN 201910578163.0 dated May 27, 2021.

Notification to Grant Patent Right for Invention dated Aug. 17. 2021.

Xi Gui Zhang, et al.: "Simulation and Experimental Studies of Lithium and Nickel Atomic Shuttering in Li Me02 Materials", Anal., Acta Inorg. Mater., vol. 25, No. 1, pp. 8-12, Jan. 31, 2010.

ISR for International Application PCT/CN2020/084339 dated Aug. 6, 2020.

Written Opinion for International Application PCT/CN2020/084339 dated Aug. 6, 2020.

Chinese Office Action for counterpart application 201910578163.0 dated May 27, 2021.

Extended European search report of EPO family application Application No. 20832963.1, dated Mar. 25, 2022, 3 pages.

EPO First Office Action for Application No. 20832963.1, dated Jul. 18, 2022, 3 pages.

EPO Second Office Action for Application No. 20832963.1, dated Dec. 2, 2022, 4 pages.

Translation of ISR and Written Opinion for Application No. PCT/CN2020/084339, dated Jul. 15, 2020, 6 pages.

Haruki Kaneda, et al., "Single-Crystal-Like Durable LiNiO2 Positive Electrode Materials for Lithium-Ion Batteries," ACS Appl. Mater. Interfaces 2022, 14, 47, 52766-52778. Nov. 16, 2022.

Guangmin Wei, et. al., "Mechanism of two-dimensional crystal formation from soft microgel particles", Soft Matter, 2013, 9, 9924 (8 pages).

(Continued)

*Primary Examiner* — Carlos Barcena

(74) *Attorney, Agent, or Firm* — Ladas & Parry LLP

(57) ABSTRACT

This disclosure relates to the electrochemical field, and in particular, to a positive electrode material and a preparation method and usage thereof. The positive electrode material of this disclosure includes a substrate, where a general formula of the substrate is $Li_xNi_yCo_zM_kMe_pO_rA_m$, where $0.95 \le x \le 1.05$, $0.5 \le y \le 1$, $0 \le z \le 1$, $0 \le k \le 1$, $0 \le p \le 0.1$, $1 \le r \le 5.2$, $0 \le m \le 2$, $m+r \le 2$, M is selected from one or more of Mn and Al, Me is selected from one or more of Zr, Zn, Cu, Cr, Mg, Fe, V, Ti, Sr, Sb, Y, W, and Nb, and A is selected from one or more of N, F, S, and Cl; and an oxygen defect level of the positive electrode material satisfies at least one of condition (1) or condition (2): (1) $1.77 \le OD1 \le 1.90$; or (2) $0.69 \le OD2 \le 0.74$.

16 Claims, No Drawings

(56) References Cited

OTHER PUBLICATIONS

Francesco Del Giudice, et. al., "Microfluidic formation of crystal-like structures," Lap Chip, 2021, 21, 2069-2094.

* cited by examiner

POSITIVE ELECTRODE MATERIAL AND PREPARATION METHOD AND USAGE THEREOF

CROSS-REFERENCE TO RELATED APPLICATIONS

This application is a continuation of International Patent Application No. PCT/CN2020/084339 filed on Apr. 11, 2020, which claims priority to the Chinese Patent Application No. 201910578163.0, filed on June 28, which is incorporated herein by reference in its entirety.

TECHNICAL FIELD

This disclosure relates to the electrochemical field, and in particular, to a long-life positive electrode material and a preparation method and usage thereof.

BACKGROUND

With escalation of energy crisis and environmental issues, development of new-type green energy sources becomes extremely urgent. Lithium-ion batteries have been applied to various fields due to advantages such as a high specific energy, application in a wide range of temperature, a low self-discharge rate, a long cycle life, good safety performance, and no pollution. The lithium-ion batteries acting as a vehicle energy system to replace conventional diesel locomotives have been gradually put into trial around the world. However, lithium iron phosphate (LiFePO4) and low nickel ternary ($LiNi_{1/3}Co_{1/3}Mn_{1/3}O_2$) commonly used at present are limited by nature of the material itself and cannot fully meet energy density requirements of traction batteries on a positive electrode material of lithium-ion batteries. Increasing nickel content in a high nickel ternary positive electrode material can improve the energy density of batteries. Therefore, the high nickel ternary positive electrode material is one of main objects of research on traction batteries. However, with the increase of the nickel content, Li/Ni mixing of the positive electrode material has increased significantly, and oxygen defects of the material have also increased significantly. Cycle performance of high-capacity traction batteries deteriorates rapidly with a short calendar life, which is currently one of bottlenecks of commercial mass production.

At present, main means for improving cycle performance in terms of ternary positive electrode material are optimizing main element content, doping, and modification by coating. With the three means, the cycle performance can be improved to some extent, but still has a gap to meet the market demand.

SUMMARY

In view of the disadvantages of the prior art, this disclosure is intended to provide a long-life positive electrode material and a preparation method and usage thereof to solve the problems in the prior art.

In order to achieve the above and other related purposes, one aspect of this disclosure provides a long-life positive electrode material, including a substrate, where the general formula of the substrate is $Li_xNi_yCo_zM_kMe_pO_rA_m$, where $0.95 \leq x \leq 1.05$, $0.5 \leq y \leq 1$, $0 \leq z \leq 1$, $0 \leq k \leq 1$, $0 \leq p \leq 0.1$, $1 \leq r \leq 5.2$, $0 \leq m \leq 2$, $m+r \leq 2$, M is selected from Mn and/or Al, Me is selected from one or more of Zr, Zn, Cu, Cr, Mg, Fe, V, Ti, Sr, Sb, Y, W, and Nb, and A is selected from one or more of N, F, S, and Cl; and an oxygen defect level of the positive electrode material satisfies at least one of condition (1) or condition (2):

(1) $1.77 \leq OD1 \leq 1.90$, where $OD1=(I_{101}/I_{012})^{0.5}$, $I_{101}$ represents XRD diffraction peak intensity of the (101) crystal plane of the positive electrode material in an XRD pattern, and $I_{012}$ represents diffraction peak intensity of the (012) crystal plane of the positive electrode material in the XRD pattern; and (2) $0.69 \leq OD2 \leq 0.74$, where $OD2=(I_{101}/I_{104})^{0.5}$, $I_{101}$ represents XRD diffraction peak intensity of the (101) crystal plane of the positive electrode material in the XRD pattern, and $I_{104}$ represents diffraction peak intensity of the (104) crystal plane of the positive electrode material in the XRD pattern.

Another aspect of this disclosure provides a positive electrode plate, including a positive electrode current collector and a positive electrode active material layer, where the positive electrode active material layer includes the positive electrode material.

Another aspect of this disclosure provides an electrochemical energy storage apparatus, including the positive electrode material or the positive electrode plate.

Compared with the prior art, this disclosure has the following beneficial effects:

In this disclosure, the positive electrode material has a higher Ni content, and fewer oxygen defects, so its crystal structure is stable with a low Li/Ni mixing ratio, ensuring that a battery using the positive electrode material has higher energy density and long cycle life, and effectively suppressing gas generation during cycling.

DESCRIPTION OF EMBODIMENTS

A positive electrode material of this disclosure, a lithium-ion battery including the positive electrode material, and a preparation method thereof are described in detail below.

A first aspect of this disclosure provides a positive electrode material, including a substrate, where the general formula of the substrate is $Li_xNi_yCo_zM_kMe_pO_rA_m$, where $0.95 \leq x \leq 1.05$, $0.5 \leq y \leq 1$, $0 \leq z \leq 1$, $0 \leq k \leq 1$, $0 \leq p \leq 0.1$, $1 \leq r \leq 5.2$, $0 \leq m \leq 2$, $m+r \leq 2$, M is selected from Mn and/or Al, Me is selected from one or more of Zr, Zn, Cu, Cr, Mg, Fe, V, Ti, Sr, Sb, Y, W, and Nb, and A is selected from one or more of N, F, S, and Cl; and an oxygen defect level of the positive electrode material satisfies at least one of condition (1) and condition (2):

(1) $1.77 \leq OD1 \leq 1.90$, where $OD1=(I_{101}/I_{012})^{0.5}$, $I_{101}$ represents XRD diffraction peak intensity of the (101) crystal plane of the positive electrode material in an XRD pattern, and $I_{012}$ represents diffraction peak intensity of the (012) crystal plane of the positive electrode material in the XRD pattern; and (2) $0.69 \leq OD2 \leq 0.74$, where $OD2=(I_{101}/I_{104})^{0.5}$, Ii1 represents XRD diffraction peak intensity of the (101) crystal plane of the positive electrode material in the XRD pattern, and 1104 represents diffraction peak intensity of the (104) crystal plane of the positive electrode material in the XRD pattern.

A high nickel ternary material is prone to oxygen defects ($LiMeO_{2-x}$) during sintering, while the relative level of oxygen defects is closely related to structural stability and high-temperature storage performance of the positive electrode material. Researchers of this application have found that values of the oxygen defect levels OD1 and/or OD2 mainly depend on process control related to oxygen binding such as a precursor preparation process and a powder sintering process. By adjusting speed, temperature and pH of a stirring process during synthesis of the precursor to improve adhesion ability of hydroxide ions, and adjusting sintering temperature, sintering time and oxygen flow of a sintering process, the oxygen defect level of the positive electrode material can be controlled to satisfy 1.77≤OD1≤1.90 and/or 0.69≤OD2≤0.74, which can ensure that the high nickel positive electrode material has a relatively complete crystal structure and good structural stability. Therefore, the crystal is less likely to collapse during intercalation and deintercalation of lithium ions, which is beneficial to prolong service life.

In an embodiment of this disclosure, the oxygen defect level of the positive electrode material is calculated by analyzing the diffraction peak intensities of (003), (101), and (012) crystal planes by using the XRD pattern. The specific test conditions for the XRD pattern should be known to those skilled in the art. For example, the test conditions for the XRD pattern of the positive electrode material can be 1.6 kW power, a 1°/min test step size, and a deduction of kα2 from the test pattern. The inventors have diligently studied and found that the oxygen defect level of the positive electrode material is closely related to the stability of the crystal structure, which can be characterized by characterizing a relationship between diffraction peak intensity of special crystal planes in the XRD pattern. According to a characteristic of an R-3m point group structure of a ternary layered material, the crystal planes with no contribution from oxygen atoms and moderate intensity include (003) and (101), the crystal planes with positive contribution from oxygen atoms and moderate intensity include (104) and (110), and crystal planes with negative contribution from oxygen atoms and moderate intensity include (012). Therefore, the oxygen defect level of the ternary layered material characterized by $I_{101}/I_{012}$ or $I_{101}/I_{104}$ has higher accuracy. Further, a relationship between the intensity ratio of the XRD diffraction peaks, $I_{101}/I_{012}$ or $I_{101}/I_{104}$, and x is typically a cubic polynomial function, while a relationship between an intensity ratio with power-of-0.5 and x is typically a linear function. Therefore, the intensity ratio with power-of-0.5 is an indicator of oxygen defects. Since $I_{012}$ has small peak intensity, $OD1=(I_{101}/I_{012})^{0.5}$ has a large variation range and is highly recognizable, which is suitable to serve as a main indicator of oxygen defects. According to the calculation function, it can be learned that the larger $(1101/1012)^{05}$ indicates a smaller x value in the molecular formula $LiMeO_{2-x}$ and fewer oxygen defects in the material, and vice versa. In addition, $I_{101}$ and $I_{104}$ have obvious intensity and moderate half-peak width, also suitable to serve as main indicators of oxygen defects.

In the positive electrode material provided in an embodiment of this disclosure, the OD1 may range from 1.77 to 1.90, 1.77 to 1.78, 1.78 to 1.79, 1.79 to 1.80, 1.80 to 1.81, 1.81 to 1.82, 1.82 to 1.83, 1.83 to 1.84, 1.84 to 1.85, 1.85 to 1.86, 1.86 to 1.87, 1.87 to 1.88, 1.88 to 1.89, or 1.89 to 1.90. The OD2 may range from 0.69 to 0.74, 0.69 to 0.70, 0.70 to 0.71, 0.71 to 0.72, 0.72 to 0.73, or 0.73 to 0.74.

In the positive electrode material provided by an embodiment of this disclosure, when the oxygen defect level of the positive electrode material satisfies both conditions of 1.77≤OD1≤1.90 and 0.69≤OD2≤0.74, the oxygen defect level in the crystal structure of a layered ternary positive electrode material can be more accurately characterized, making the characterization of oxygen defects more reliable. In addition, the layered ternary material that meets the above conditions has a highly stable crystal structure, so it is not prone to have gassing issue under high temperature storage conditions and has a longer cycle life.

In the positive electrode material provided by an embodiment of this disclosure, when the positive electrode material is single-crystal or single-crystal-like particles, an OD1 value of the material is typically smaller than an OD1 value of the material when the positive electrode material is secondary particles. The reason is that single-crystal or single-crystal-like particles are synthesized at higher sintering temperature, which is more likely to produce oxygen defects. Therefore, the relative amount of oxygen defects in a single-crystal ternary material needs to be controlled to be even lower. For example, when the positive electrode material is single-crystal or single-crystal-like particles, OD1 can range from 1.77 to 1.87; and for another example, when the positive electrode material is secondary particles, OD1 can range from 1.82 to 1.90. For another example, when the positive electrode material is single-crystal or single-crystal-like particles, OD2 can range from 0.69 to 0.71; and for another example, when the positive electrode material is secondary particles, OD2 can range from 0.71 to 0.74.

In the positive electrode material provided by an embodiment of this disclosure, a Li/Ni mixing ratio of the positive electrode material may be 0.1% to 3%, and preferably, the Li/Ni mixing ratio of the positive electrode material may be 0.5% to 2%. The Li/Ni mixing ratio can typically be calculated by collecting percentages of Ni atoms and Li atoms in a lithium layer and a transition metal layer through refining XRD data. Generally speaking, there is no fixed absolute mixing ratio of lithium and nickel. A larger value does not necessarily mean poorer performance, and a material with a higher mixing ratio may sometimes include a protective layer that can inhibit side reactions at an interface. In an embodiment of this disclosure, the Li\Ni mixing ratio of the positive electrode material being in the above range can reduce impact on active lithium participating in intercalation/deintercalation reaction, allowing less impact on gram capacity of the ternary positive electrode material, and ensuring an insignificant increase in DCR during cycling.

In the positive electrode material provided by an embodiment of this disclosure, a mean microstress (Mean Microstress, MMS) of the positive electrode material may be in a range of 0.03 to 0.20, 0.03 to 0.04, 0.04 to 0.05, 0.05 to 0.06, 0.06 to 0.07, 0.07 to 0.08, 0.08 to 0.09, 0.09 to 0.10, 0.10 to 0.12, 0.12 to 0.14, 0.14 to 0.16, 0.16 to 0.18, or 0.18 to 0.20. When the mean microstress MMS of the positive electrode material is within the above range, the crystal structure of the positive electrode material is relatively stable and the internal structure of powder particles is relatively compact. Therefore, the powder particles are not prone to break during charging and discharging with intercalation/deintercalation of lithium ions, which is conducive to further improving the cycle life and alleviating the gassing issue of lithium-ion batteries. In this disclosure, the mean microstress $MMS=(\beta_{hk1}\cdot\cot\theta_{hkl})/4$, where $\beta_{hkl}$ represents a half-peak width of a characteristic diffraction peak (hkl) in the XRD pattern of the positive electrode material, and $\theta_{hkl}$ represents a diffraction angle corresponding to the characteristic diffraction peak (hkl) in the XRD pattern of the positive electrode material. When the positive electrode material is single-crystal or single-crystal-like particles, MMS may be in a range of 0.03 to 0.07, 0.03 to 0.04, 0.04 to 0.05, 0.05 to 0.06, or 0.06 to 0.07. When the positive material is secondary particles, MMS may be in a range of 0.07 to 0.20, 0.07 to 0.08, 0.08 to 0.09, 0.09 to 0.10, 0.10 to 0.12, 0.12 to 0.14, 0.14 to 0.16, 0.16 to 0.18, or 0.18 to 0.20. In this disclosure, the MMS can be tested in accordance with the method given in the examples. Such testing method focuses on ensuring a stable XRD baseline for the tested sample, and the least possible fluctuation of half-peak width values of diffraction peaks, so as to ensure reliability of the MMS data.

In the positive electrode material provided by an embodiment of this disclosure, the substrate internally may contain a doping element, where the doping element is selected from one or more of Mg, Al, Ti, Co, Fe, Cd, Zr, Mo, Zn, B, P, Cu, V, and Ag. Preferably, the doping element may be selected from one or more of Al, Ti, and Zr, and is electrochemically inert without changing its chemical valence state during intercalation/deintercalation of lithium ions. In addition, as the doping element has a slightly smaller the ionic radius than Ni, Co, and Mn, the doping element can be better intercalated into a body center of the close-packed crystal structure, so that the crystal structure of the positive electrode material is more stable, which is conducive to reducing the oxygen defect level of the positive electrode material. In the embodiments of this disclosure, a mass percentage of the doping element in the positive electrode material may be 200 ppm to 9000 ppm, 200 ppm to 300 ppm, 300 ppm to 500 ppm, 500 ppm to 1000 ppm, 1000 ppm to 2000 ppm, 2000 ppm to 3000 ppm, 3000 ppm to 5000 ppm, 5000 ppm to 7000 ppm, or 7000 ppm to 9000 ppm. In the embodiments of this disclosure, doping the substrate with the foregoing element and controlling the amount of doping element to be within a specified range can increase binding energy of Ni, Co, and Mn elements with oxygen in transition metal sites of the crystal structure, which is conducive to preparing ternary cathode materials with fewer oxygen defects, and improving stability and thermodynamic performance of the crystal structure. It also ensures a higher intrinsic electronic conductivity of the positive electrode material, which is conducive to improving cycle performance.

In the positive electrode material provided by an embodiment of this disclosure, the substrate of the positive electrode material may include secondary particles formed by agglomeration of primary particles, where $D_v50$ of the secondary particles may be 5 μm to 18 μm, and a particle size of the primary particles can be in a range of 0.1 μm to 1 μm. The $D_v50$ typically refers to a particle size of the sample with a cumulative volume distribution percentage reaching 50%. Specifically, the $D_v50$ of the secondary particles may be 5 μm to 18 μm, 5 μm to 16 μm, or 8 μm to 15 μm; and the particle size the primary particles may be in a range of 0.1 μm to 1 μm, 0.1 μm to 0.9 μm, 0.2 μm to 0.8 μm, or 0.2 μm to 0.5 μm.

In the positive electrode material provided by an embodiment of this disclosure, the substrate of the positive electrode material may include single-crystal or single-crystal-like particles, where $D_v50$ of the single-crystal or single-crystal-like particles may be 1 μm to 7 μm, 1 μm to 3 μm, 3 μm to 5 μm, or 5 μm to 7 μm, $D_v10$ may be 1 μm to 3 μm, and $D_v90$ may be 5 μm to 10 μm, 5 μm to 8 μm, or 8 μm to 10 μm. Preferably, $D_v50$ of the single-crystal particles is 3 μm to 5 μm.

In the positive electrode material provided by an embodiment of this disclosure, the positive electrode material may further include a coating layer located on a surface of the substrate, where the coating layer includes a coating element, and the coating element is selected from one or more of Al, Ba, Zn, Ti, W, Y, Si, Sn, and B. Providing a coating layer on the surface of the substrate can effectively passivate the surface of the high nickel lithium transition metal oxide, thus isolating it from an electrolytic solution, reducing the amount of residual lithium on the surface of the active material, and alleviating the gassing issue. If the oxide used is a simple oxide with excellent ion conductivity and relatively poor electronic conductivity, polarization of the positive electrode material may be increased and cycle performance of the battery may be deteriorated. Therefore, in the embodiments of this disclosure, in combination with modification by coating the surface of the substrate with an oxide, a specified doping element is used with an optimized doping amount, allowing higher intrinsic electronic conductivity of the positive electrode material, and less residual lithium and other impurities on the surface. This effectively reduces side reactions of the material with the electrolytic solution, and reduces interface resistance between the electrolytic solution and the positive electrode active material, thereby greatly reducing the polarization of the battery and improving the cycle performance and rate performance of the battery.

In a preferred embodiment of this disclosure, the coating element content in the coating layer ranges from 100 ppm to 3000 ppm, more preferably, 200 ppm to 2000 ppm, and the coating layer typically refers to a material covering the surface of a positive electrode particle within thickness of 5 nm to 20 nm.

In the positive electrode material provided by an embodiment of this disclosure, the positive electrode material typically has some powder resistivity. For example, the powder resistivity p of the positive electrode material under 12 MPa may be 10 Ω·cm to 4500 Ω·cm, preferably, 1000 Ω·cm to 4000 Ω·cm, more preferably, 1000 Ω·cm to 2000 Ω·cm. In an embodiment of this disclosure, in order to obtain a low oxygen defect level, the high nickel ternary positive electrode material needs a doping and/or coating process. This may lead to a high powder resistivity of the positive electrode material and deteriorate kinetics of the battery as the doping element and the coating layer are chemically inert elements. In an embodiment of this disclosure, the doping and/or coating amount and the synthesis process are adjusted to further control the powder resistivity of the positive electrode material to be within the above range, thus making a relatively high intrinsic electronic conductivity of the positive electrode material and reducing the interface resistance between the electrolytic solution and the positive electrode active material. In turn, polarization of the battery is greatly reduced and cycle performance and service life of the battery are further improved.

In some embodiments of this disclosure, the powder resistivity p of the positive electrode material under 12 MPa may be in a range of 10 Ω·cm to 4500 Ω·cm, 10 Ω·cm to 4000 Ω·cm, 10 Ω·cm to 3000 Ω·cm, 10 Ω·cm to 2000 Ω·cm, 1000 Ω·cm to 2000 Ω·cm, 2000 Ω·cm to 3000 Ω·cm, or 3000 Ω·cm to 5000 Ω·cm.

In an embodiment of this disclosure, the powder resistivity of the positive electrode active material under 12 MPa can be measured by a known powder resistivity test method. In a specific embodiment of this disclosure, a four-probe method can be used to test the powder resistivity of the positive electrode active material under 12 MPa. The test method includes: adding 0.4 g of positive electrode active material powder to a sample mold (with an inner diameter of 11.28 mm), applying 12 MPa pressing force to the powder through a press machine, and reading the powder resistivity of the positive electrode active material under 12 MPa through a resistivity meter after the pressure is stabilized.

In the positive electrode material provided by an embodiment of this disclosure, $Li_2CO_3$ content in the residual lithium on the surface of the positive electrode material (that is, a mass of $Li_2CO_3$ in the residual lithium on the surface of the substrate relative to a total mass of the positive electrode material) is less than 3000 ppm, and preferably, $Li_2CO_3$ content in the residual lithium is less than 2000 ppm. LiOH content in the residual lithium on the surface of the positive electrode material (that is, a mass of LiOH in the residual lithium on the surface of the positive electrode material relative to the total mass of the positive electrode material) is less than 5000 ppm, and preferably, LiOH content in the residual lithium is less than 4000 ppm. The substrate of the positive electrode material in an embodiment of this disclosure is lithium nickel cobalt manganese oxide with high nickel content, and the surface residual lithium content is usually high. Providing the coating layer on the surface of the substrate can effectively reduce the residual lithium content on the surface, but may lead to greater polarization of the positive electrode material. Choosing a positive electrode material with a surface residual lithium content in the above range can strike an effective balance between gassing and polarization problems, helping to obtain a battery with higher capacity, insignificant gassing, and excellent cycle and rate performance.

A second aspect of this disclosure provides a method for preparing the positive electrode material, including: mixing and sintering raw materials of a substrate to provide the substrate. Those skilled in the art can control the oxygen defect level in a ternary material by adjusting processes related to oxygen binding such as a precursor preparation process and a powder sintering process. Specifically, the positive electrode material in the first aspect of this disclosure is provided by adjusting speed, temperature, and pH of a stirring process during precursor synthesis and adjusting sintering temperature, sintering time, and oxygen flow during sintering. The raw materials required to prepare the substrate should be known to those skilled in the art. For example, the raw materials of the substrate may include a ternary material precursor of nickel-cobalt-manganese and/or aluminum, a lithium source, an M source, a Me source, an A source, and the like, and proportions of the raw materials are typically based on proportions of the elements in the substrate. More specifically, the ternary material precursor may include, but is not limited to, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, or $0.9Ni_{0.9}Co_{0.05}Mn_{0.05}(OH)_2 \cdot 0.1Al_2(OH)_3$; the lithium source may be a lithium-containing compound, where the lithium-containing compound may include but is not limited to one or more of $LiOH \cdot H_2O$, LiOH, $Li_2CO_3$, $Li_2O$, and the like; the Me source may typically be a compound containing Me element, where the compound containing Me element may be one or more of an oxide, a nitrate, a carbonate containing at least one element of Zr, Zn, Cu, Cr, Mg, Fe, V, Ti, Sr, Sb, Y, W, Nb, or Al; and the A source may be a compound containing element A, where the compound containing element A may include but is not limited to one or more of LiF, NaCl, or NaBr. For another example, a secondary particle with an OD1 value ranging from 1.79 to 1.90 can be prepared at a sintering temperature of 780° C. to 900° C., 780° C. to 800° C., 800° C. to 820° C., 820° C. to 840° C., 840° C. to 860° C., 860° C. to 880° C., or 880° C. to 900° C., with a sintering time of 5 h to 15 h, 5 h to 7 h, 7 h to 9 h, 9 h to 11 h, 11 h to 13 h, or 13 h to 15 h, and an oxygen concentration of 20% to 35%, 20% to 25%, 25% to 30%, or 30% to 35%. For another example, a single-crystal or single-crystal-like particle with an OD1 value ranging from 1.77 to 1.87 can be prepared at a sintering temperature of 850° C. to 950° C., 850° C. to 870° C., 870° C. to 890° C., 890° C. to 910° C., 910° C. to 930° C., or 930° C. to 950° C., with a sintering time of 5 h to 15 h, 5 h to 7 h, 7 h to 9 h, 9 h to 11 h, 11 h to 13 h, or 13 h to 15 h, and an oxygen concentration of 20% to 40%, 20% to 25%, 25% to 30%, 30% to 35%, or 35% to 40%. For another example, a secondary particle with an OD2 value ranging from 0.70 to 0.74 can be prepared at a sintering temperature of 780° C. to 900° C., 780° C. to 800° C., 800° C. to 820° C., 820° C. to 840° C., 840° C. to 860° C., 860° C. to 880° C., or 880° C. to 900° C., with a sintering time of 5 h to 15 h, 5 h to 7 h, 7 h to 9 h, 9 h to 11 h, 11 h to 13 h, or 13 h to 15 h, and an oxygen concentration of 20% to 35%, 20% to 25%, 25% to 30%, or 30% to 35%. For another example, a single-crystal or single-crystal-like particle with an OD2 value ranging from 0.69 to 0.72 can be prepared at a sintering temperature of 850° C. to 950° C., 850° C. to 870° C., 870° C. to 890° C., 890° C. to 910° C., 910° C. to 930° C., or 930° C. to 950° C., with a sintering time of 5 h to 15 h, 5 h to 7 h, 7 h to 9 h, 9 h to 11 h, 11 h to 13 h, or 13 h to 15 h, and an oxygen concentration of 20% to 40%, 20% to 25%, 25% to 30%, 30% to 35%, or 35% to 40%.

In the preparation method of the positive electrode material provided in an embodiment of this disclosure, when the substrate is provided with a coating layer on the surface, the preparation method may further include: forming the coating layer on the surface of the substrate. The method of forming the coating layer on the surface of the substrate should be known to those skilled in the art, and for example, may include: sintering the substrate under a condition with presence of a compound containing a coating element, so as to form the coating layer on the surface of the substrate. Based on parameters such as composition of the coating layer and the powder resistivity of the substrate, those skilled in the art can select a proper type, proportion, and sintering condition for the compound containing the coating element. For example, the compound containing the coating element may include but is not limited to one or more of $Al_2O_3$, ZnO, $ZrO_2$, $TiO_2$, MgO, $WO_3$, $Y_2O_3$, $Co_2O_3$, $Ba(NO_3)_2$, $Cp_2O_3$, $P_2O_5$, or $H_3BO_3$. For another example, the amount of the coating element used may be 0.01 wt % to 0.5 wt %, 0.01 wt % to 0.05 wt %, 0.05 wt % to 0.1 wt %, 0.1 wt % to 0.2 wt %, 0.2 wt % to 0.3 wt %, 0.3 wt % to 0.4 wt %, or 0.4 wt % to 0.5 wt % of a mass of the substrate. For another example, the sintering temperature may be 300° C. to 650° C., 300° C. to 350° C., 350° C. to 400° C., 400° C. to 450° C., 450° C. to 500° C., 500° C. to 550° C., 550° C. to 600° C., or 600° C. to 650° C., the sintering time may be 2 h to 5 h, 2 h to 3 h, 3 h to 4 h, or 4 h to 5 h, and the oxygen concentration may be 20% to 30%, 20% to 22%, 22% to 24%, 24% to 26%, 26% to 28%, or 28% to 30%.

A third aspect of this disclosure provides a positive electrode plate, where the positive electrode plate includes a positive electrode current collector and a positive electrode active material layer, and the positive electrode active material layer includes the positive electrode material in the first aspect of this disclosure. The positive electrode current collector may typically be a layer, and the positive electrode active material layer may typically cover at least partially the surface of the positive electrode current collector, or may be a layer extending along the surface of the positive electrode current collector. The positive electrode current collector is typically a structure or a part that collects current, for example, a metal foil (for example, a copper foil or an aluminum foil). Those skilled in the art may select a suitable method for preparing the positive electrode plate. For example, the following steps may be included: mixing the positive electrode material, a binder, and a conductive agent to form a slurry, and applying the slurry on the positive electrode current collector.

A fourth aspect of this disclosure provides an electrochemical energy storage apparatus, including the positive electrode material in the first aspect of this disclosure or the positive electrode plate in the third aspect of this disclosure. The electrochemical energy storage apparatus may be a super capacitor, a lithium-ion battery, a lithium metal battery, or a sodium-ion battery. In the embodiments of this disclosure, only an embodiment in which the electrochemical energy storage apparatus is a lithium-ion battery is illustrated, but this disclosure is not limited thereto.

The lithium-ion battery provided by the embodiments of this disclosure may typically include a positive electrode plate, a negative electrode plate, a separator sandwiched between the positive electrode plate and the negative electrode plate, and an electrolytic solution. The method for preparing the lithium-ion battery should be known to those skilled in the art. For example, the positive electrode plate, the separator, and the negative electrode plate may each be a layer, and may be cut to a target size and then stacked in order. The stack may be further wound to a target size to form a battery core, which may be further combined with the electrolytic solution to form a lithium-ion battery.

In the lithium-ion battery provided by the embodiments of this disclosure, the negative electrode plate typically includes a negative electrode current collector and a negative electrode active material layer located on a surface of the negative electrode current collector, and the negative electrode active material layer typically includes a negative electrode active material. The negative electrode active material may be various materials suitable for use as the negative electrode active material of a lithium-ion battery in the art, for example, may include but is not limited to one or more of graphite, soft carbon, hard carbon, carbon fiber, mesophase carbon microbeads, silicon-based material, tin-based material, lithium titanate, or other metals capable of forming alloys with lithium. The graphite may be selected from one or more of artificial graphite, natural graphite, and modified graphite. The silicon-based material may be selected from one or more of elemental silicon, a silicon-oxygen compound, a silicon-carbon composite, and a silicon alloy. The tin-based material may be selected from one or more of elemental tin, a tin-oxygen compound, and a tin alloy. The negative electrode current collector may typically be a structure or a part that can collect current. The negative electrode current collector may be a variety of materials suitable for use as the negative electrode current collector of a lithium-ion battery in the art. For example, the negative electrode current collector may include but is not limited to a metal foil, and more specifically, may include but is not limited to a copper foil and the like.

In the lithium-ion battery provided by the embodiments of this disclosure, the separator may be of various materials suitable for lithium-ion batteries in the field, for example, including but not limited to one or more of polyethylene, polypropylene, polyvinylidene fluoride, kevlar, polyethylene terephthalate, polytetrafluoroethylene, polyacrylonitrile, polyimide, polyamide, polyester, and natural fibers.

In the lithium-ion battery provided by the embodiments of this disclosure, the electrolytic solution may be various electrolytic solutions suitable for lithium-ion batteries in the art. For example, the electrolytic solution typically includes an electrolyte and a solvent, and the electrolyte may typically include a lithium salt. More specifically, the lithium salt may be an inorganic lithium salt and/or an organic lithium salt, and may specifically include but is not limited to one or more of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, a concentration of the electrolyte may be in a range of 0.8 mol/L to 1.5 mol/L. The solvent may be various solvents suitable for the electrolytic solution of a lithium-ion battery in the art, and the solvent of the electrolytic solution is typically a non-aqueous solvent, preferably, an organic solvent, and specifically may include but is not limited to one or more of ethylene carbonate, propylene carbonate, butylene carbonate, pentene carbonate, dimethyl carbonate, diethyl carbonate, dipropyl carbonate, ethyl methyl carbonate, and the like, or halogenated derivatives thereof.

The following describes embodiments of this disclosure by using specific examples. Those skilled in the art can easily learn other advantages and effects of this disclosure through the content disclosed in this specification. This disclosure may further be implemented or applied through other different specific embodiments, and various details in this specification can also be modified or changed based on different viewpoints and applications without departing from the spirit of this disclosure.

It should be noted that processing devices or apparatuses not specifically noted in the following embodiments are all conventional devices or apparatuses in the art.

In addition, it should be understood that the one or more method steps mentioned in this disclosure do not exclude that there may be other method steps before and after the combined steps or that other method steps may be inserted between these explicitly mentioned steps, unless otherwise specified. It should further be understood that the combination and connection relationship between one or more devices/apparatuses mentioned in this disclosure do not exclude that there may be other devices/apparatuses before and after the combined devices/apparatuses or that other devices/apparatuses may be inserted between the two explicitly mentioned devices/apparatuses, unless otherwise specified. Moreover, unless otherwise specified, numbers of the method steps are merely a tool for identifying the method steps, but are not intended to limit the order of the method steps or to limit the implementable scope of this disclosure. In the absence of substantial changes in the technical content, alteration or adjustment of their relative relationships shall be also considered as falling within the implementable scope of this disclosure.

Example 1

Preparation of a Positive Electrode Material

Step 1: A substrate precursor was prepared. Nickel sulfate, manganese sulfate, and cobalt sulfate were mixed at a molar ratio of 8:1:1 into an aqueous solution with a concentration of 1 mol/L. The aqueous solution was stirred for 6 h at a stirring speed of 1000 rpm, a water bath temperature of 55° C. and pH of 11, and aged for 12 h at room temperature. After filtering and washing, the precursor $Ni_{0.5}Co_{0.1}Mn_{0.1}(OH)_2$ of 9 μm to 11 μm transition metal oxide was obtained.

Step 2: The substrate precursor $Ni_{0.5}Co_{0.1}Mn_{0.1}(OH)_2$ obtained in step 1 and lithium hydroxide were mixed in a high-speed mixer with a molar ratio of the substrate precursor to the lithium hydroxide being 1.05, then the mixture was transferred to an oxygen atmosphere furnace (30% oxygen) and sintered there for 10 h at 910° C., accompanied by airflow crushing, to obtain a substrate of the positive electrode material with a single crystal structure.

Step 3: The substrate of the positive electrode active material and an alumina compound with 0.5 wt % were mixed in the mixer, and then the mixture was transferred to the oxygen atmosphere furnace and sintered there at 450° C. to form a coating layer of the positive electrode active material. Thus, a finished positive electrode material was obtained.

Example 2

It is the same as Example 1 except that in step 2, 0.2 wt % zirconium oxide was added, and the sintering temperature was set to 900° C.

Example 3

It is the same as Example 1 except that in step 2, 0.3 wt % zirconium oxide was added, and the sintering temperature was set to 900° C.; and the coating in step 3 was a boron oxide compound, and the amount of the coating fed was set to 0.2 wt %.

Example 4

It is the same as Example 1 except that in step 2, 0.1 wt % zirconium oxide was added, the sintering temperature was set to 800° C., the sintering time was 9 h, and no airflow crushing was performed; and the coating in step 3 was aluminum oxide and boron oxide, where the amount of the aluminum oxide coating fed was set to 0.3 wt %, and the amount of the boron oxide coating fed was set to 0.2 wt %.

Example 5

It is the same as Example 1 except that in step 2, 0.3 wt % niobium oxide was added, the sintering temperature was set to 800° C., the sintering time was 8.5 h, and no airflow crushing was performed.

Example 6

It is the same as Example 1 except that in step 2, 0.2% tungsten oxide was added, the sintering temperature was set to 800° C., the sintering time was 8.5 h, and no airflow crushing was performed; and the coating in step 3 was 0.3 wt % boron oxide, where the sintering temperature of the coating was set to 500° C.

Example 7

It is the same as Example 1 except that in step 2, 0.1 wt % zirconium oxide was added, and the initial sintering temperature was set to 900° C., the sintering time was 7.5 h, no airflow crushing was performed, and the oxygen concentration was 35%; and the coating in step 3 was aluminum oxide, and the amount of the coating fed was set to 0.2 wt %.

Example 8

It is the same as Example 1 except that in step 2, 0.3 wt % titanium oxide was added, and the sintering temperature was set to 900° C., the sintering time was set to 12 h, and no airflow crushing was performed; and the coating in step 3 was aluminum oxide, and the amount of the coating fed was set to 0.4 wt %.

Comparative Example 1

It is the same as Example 4 except that in step 1, the aqueous solution was stirred for 5 h at a stirring speed of 1500 rpm, a water bath temperature of 45° C., and pH of 9, and aged 9 h at room temperature; and in step 2, the sintering temperature was set to 920° C., the oxygen concentration was 20%, no airflow crushing was performed, and the amount of the coating fed was set to 0.1 wt %.

Comparative Example 2

It is the same as Example 4 except that in step 1, the aqueous solution was stirred for 5 h at a stirring speed of 500 rpm, a water bath temperature of 85° C., and pH of 14, and aged 13 h at room temperature; in step 2, 1.2 wt % zinc oxide was added, the sintering temperature was set to 900° C., the sintering time was 7.5 h, the oxygen concentration was 40%, and no airflow crushing was performed; and in step 3, the amount of the coating fed was set to 0.2 wt %.

Comparative Example 3

It is the same as Example 1 except that in step 1, the aqueous solution was stirred for 5 h at a stirring speed of 1600 rpm, a water bath temperature of 45° C., and pH of 9.5, and aged 9 h at room temperature; and in step 2, the sintering temperature was set to 950° C., the sintering time was 11.5 h, and the oxygen concentration was 35%.

Comparative Example 4

It is the same as Example 1 except that in step 1, the aqueous solution was stirred for 5 h at a stirring speed of 600 rpm, a water bath temperature of 80° C., and pH of 13, and aged 13 h at room temperature; in step 2, 1.5 wt % niobium oxide was added, the sintering temperature was set to 900° C., the sintering time was 8 h, and the oxygen concentration was 20%; and in step 3, the coating is magnesium oxide, and the amount of the coating fed was set to 0.2 wt %.

All batteries were prepared according to the following method.

(1) Preparation of a Positive Electrode Plate:

Step 1: A high nickel ternary as a positive electrode material, polyvinylidene fluoride as a binder, and acetylene black as a conductive agent were mixed in a mass ratio of 98:1:1. N-methylpyrrolidone (NMP) was added. The resulting mixture was stirred by using a vacuum mixer until the mixture was stable and uniform, to obtain a positive electrode slurry. The positive electrode slurry was applied uniformly on a 12-μm-thick aluminum foil.

Step 2: The coated electrode plate was dried in an oven at 100° C. to 130° C.

Step 3: Cold pressing and cutting were performed to obtain a positive electrode plate.

(2) Preparation of a Negative Electrode Plate

Graphite as a negative electrode active material, sodium carboxymethyl cellulose as a thickener, styrene butadiene rubber as a binder, and acetylene black as a conductive agent were mixed at a mass ratio of 97:1:1:1, deionized water was added, and the mixture was stirred by using a vacuum mixer to obtain a negative electrode slurry. The negative electrode slurry was uniformly applied onto an 8-μm-thick copper foil, the copper foil was dried at room temperature and transferred to an oven at 120° C. for further drying for 1 h, and then cold pressing and cutting were performed to obtain a negative electrode plate.

(3) Preparation of an electrolytic solution

An organic solvent was a mixture containing ethylene carbonate (EC), ethyl methyl carbonate (EMC) and diethyl carbonate (DEC), where a volume ratio of EC, EMC, and DEC was 20:20:60. In an argon atmosphere glove box with water content less than 10 ppm, fully dried lithium salt $LiPF_6$ was dissolved in the organic solvent to obtain an evenly mixed electrolytic solution, where concentration of the lithium salt was 1 mol/L.

(4) Preparation of a Separator

A 12-μm-thick polypropylene membrane was used as a separator.

(5) Preparation of a Battery

The positive electrode plate, the separator, and the negative electrode plate were stacked in order, so that the separator was sandwiched between the positive and negative electrode plates for isolation. Then, the stack was wound to obtain a square bare cell which was wrapped with an aluminum plastic film and baked at 80° C. to remove water. Then, the non-aqueous electrolytic solution was injected, followed by sealing, standing, hot and cold pressing, chemical conversion, clamping, and aging, to obtain a finished battery.

Test Method (1) Powder Resistivity Test

The powder resistivity test was performed on the positive electrode materials prepared in the examples and comparative examples. The test method is as follows:

A four-probe method was used to test the powder resistivity of the positive electrode active material under 12 MPa. The test method included: adding 0.4 g of positive electrode active material powder to a sample mold (with an inner diameter of 11.28 mm), applying 12 MPa pressing force to the powder through a press machine, and reading the powder resistivity of the positive electrode active material under 12 MPa through a resistivity meter after the pressure was stabilized. The test results of the examples and comparative examples are shown in Table 1.

(2) OD Test Method:

The 350 to 500 interval in the XRD pattern of the tested sample was slowly (<2°/min) scanned, and the image was processed with smoothing, filtering, and background removal to obtain $I_{101}$, $I_{012}$ and $I_{104}$, and further calculation was performed to obtain OD1 and OD2.

This test method is simple and effective with extremely low cost. It only requires targeting at the fixed 2Theta angle interval of the material.

(3) MMS Test Method:

The 150 to 700 interval in the XRD pattern of the tested sample was slowly (<2°/min) scanned, and the image was processed with smoothing, filtering, and background removal, and the diffraction peak half-high widths $\beta_{hkl}$ and diffraction angles $\theta_{hkl}$ corresponding to the diffraction peaks of the (003), (101), (012), (104), (105), (107), (018), (110), and (113) crystal planes were calculated, and these values were substituted into the formula $MMS=(\beta_{hkl}\cdot\cot\theta_{hkl})/4$ to obtain the mean microstress (Mean Microstress).

(4) Quantity of Cycles at 60° C. (Fading to 90%):

Cycle Test of the Battery:

1. Adjust the furnace temperature to 45° C., and rest 2 h.
2. CC 1C to 4.2V, CV 4.2V to 0.05C.
3. Rest 5 min.
4. DC 1C to 2.8V.
5. Rest 5 min.
6. Repeat step 2 to step 5 until the capacity fades to 90%.

(5) High-Temperature Storage Volume Swelling Rate at 80° C.:

The battery was fully charged at 1C to 4.2V and then placed in a thermostat at 80° C. for 30 days. A volume swelling rate of the battery was obtained by measuring an initial volume of the battery and the volume after standing for 30 days using a drainage method.

Volume swelling rate of the battery (%)=(Volume after standing for 30 days/Initial volume−1)×100%

TABLE 1

| No. | Particle morphology | OD1 | OD2 | Mean microstress MMS | Powder resistivity (Ω · cm) |
|---|---|---|---|---|---|
| Example 1 | Single crystal | 1.77 | 0.69 | 0.06 | 4123 |
| Example 2 | Single crystal | 1.83 | 0.70 | 0.04 | 3986 |
| Example 3 | Single crystal | 1.83 | 0.70 | 0.03 | 1258 |
| Example 4 | Polycrystalline | 1.90 | 0.73 | 0.10 | 1107 |
| Example 5 | Polycrystalline | 1.87 | 0.72 | 0.14 | 3251 |
| Example 6 | Polycrystalline | 1.87 | 0.72 | 0.15 | 4286 |
| Example 7 | Polycrystalline | 1.79 | 0.71 | 0.18 | 2491 |
| Example 8 | Polycrystalline | 1.88 | 0.74 | 0.12 | 2388 |
| Comparative Example 1 | Polycrystalline | 1.76 | 0.65 | 0.22 | 5195 |
| Comparative Example 2 | Polycrystalline | 1.92 | 0.81 | 0.06 | 4648 |
| Comparative Example 3 | Single crystal | 1.75 | 0.68 | 0.08 | 5276 |
| Comparative Example 4 | Single crystal | 1.91 | 0.76 | 0.02 | 4532 |

TABLE 2

| No. | Quantity of cycles at 60° C. (fading to 90%) | High-temperature storage volume swelling rate at 80° C. |
|---|---|---|
| Example 1 | 341 | 10.2% |
| Example 2 | 488 | 8.9% |
| Example 3 | 532 | 5.4% |
| Example 4 | 461 | 9.3% |
| Example 5 | 363 | 12.5% |
| Example 6 | 315 | 12.9% |
| Example 7 | 271 | 9.4% |
| Example 8 | 392 | 7.2% |
| Comparative Example 1 | 122 | 45.9% |
| Comparative Example 2 | 229 | 30.9% |
| Comparative Example 3 | 132 | 40.3% |
| Comparative Example 4 | 282 | 13.6% |

From Table 1 and Table 2, it can be learned that the oxygen defect level is closely related to the high temperature (60° C.) cycle life and the volume swelling rate under high temperature storage: as the oxygen defect level decreased (the value of OD1 or OD2 increases), the positive electrode material had a more complete crystal structure, so that the crystal structure was not prone to be damaged during high temperature cycling, hence a longer high temperature cycle life. In addition, since the positive electrode material had a more complete crystal structure, the mean microstress MMS of particles and the residual lithium content on the surface are both lower, and the gassing problem under high temperatures storage was also effectively alleviated. In addition, further reducing the powder resistivity of the finished material could also increase the high temperature cycle life.

In Comparative Example 1 and Comparative Example 3, the oxygen defect levels OD1 and OD2 of the high nickel ternary positive electrode material were excessively low, which indicates excessive oxygen defects content in the material, so the contact interface with the electrolytic solution was chemically active and prone to side reactions, resulting in excessive high temperature volume swelling of the battery and more serious gassing, while deteriorating the cycle performance. The oxygen defect levels OD1 and OD2 of the positive electrode materials in Comparative Example 2 and Comparative Example 4 were excessively high, which indicates fewer oxygen defects content in the surface of the positive electrode material after modification by coating but great impact on transmission of lithium ions. The batteries prepared by using such material had excessive impedance, which affected the long-term cycle performance.

In conclusion, this disclosure effectively overcomes various disadvantages in the prior art and is highly industrially applicable.

The foregoing embodiments only illustrate the principles and effects of this disclosure by using examples, but are not intended to limit this disclosure. Any person familiar with this technology can make modifications or changes to the foregoing embodiments without departing from the spirit and scope of this disclosure. Therefore, all equivalent modifications or changes made by a person of ordinary skill in the technical field without departing from the spirit and technical ideas disclosed in this disclosure shall still fall within the scope of the claims of this disclosure.

What is claimed is:

1. A positive electrode material, comprising a substrate, wherein a general formula of the substrate is $Li_xNi_yCo_zM_kMe_pO_rA_m$, wherein 0.95≤x≤1.05, 0.5≤y≤1, 0≤z≤1, 0≤k≤1, 0≤p≤0.1, 1≤r≤5.2, 0≤m≤2, m+r≤2, M is selected from Mn and/or Al, Me is selected from one or more of Zr, Zn, Cu, Cr, Mg, Fe, V, Ti, Sr, Sb, Y, W, and Nb, and A is selected from one or more of N, F, S, and Cl; and an oxygen defect level of the positive electrode material satisfies at least one of condition (1) and condition (2):

(1) 1.77≤OD1≤1.90, wherein $OD1=(I_{101}/I_{012})_{0.5}$, $I_{101}$ represents XRD diffraction peak intensity of the (101) crystal plane of the positive electrode material in an XRD pattern, and $I_{012}$ represents diffraction peak intensity of the (012) crystal plane of the positive electrode material in the XRD pattern; and (2) 0.69≤OD2≤0.74, wherein $OD2=(I_{101}/I_{104})^{0.5}$, $I_{101}$ represents the XRD diffraction peak intensity of the (101) crystal plane of the positive electrode material in the XRD pattern, and 1104 represents diffraction peak intensity of the (104) crystal plane of the positive electrode material in the XRD pattern; wherein a mean microstress (MMS) of the positive electrode material ranges from 0.03 to 0.20, wherein $MMS=(\beta_{hkl}\cdot\cot\theta_{hkl}/4$, $\beta_{hkl}$ represents a half-peak width of a characteristic diffraction peak (hkl) in the XRD pattern of the positive electrode material, and $\theta_{hkl}$ represents a diffraction angle corresponding to the characteristic diffraction peak (hkl) in the XRD pattern of the positive electrode material.

2. The positive electrode material according to claim 1, wherein when the positive electrode material is single-crystal particles, OD1 ranges from 1.77 to 1.87; and when the positive electrode material is secondary particles, OD1 ranges from 1.79 to 1.90.

3. The positive electrode material according to claim 1, wherein when the positive electrode material is single-crystal particles, OD2 ranges from 0.69 to 0.72; and when the positive electrode material is secondary particles, OD2 ranges from 0.70 to 0.74.

4. The positive electrode material according to claim 1, wherein a Li/Ni mixing ratio of the positive electrode material is 0.1% to 3%.

5. The positive electrode material according to claim 1, wherein the substrate internally contains a doping element, and the doping element is selected from one or more of Al, Co, Cd, Mo, B, P, and Ag.

6. The positive electrode material according to claim 1, wherein the positive electrode material further comprises a coating layer located on a surface of the substrate, the coating layer comprises a coating element, and the coating element is selected from one or more of Al, Ba, Zn, Ti, W, Y, Si, Sn, and B.

7. The positive electrode material according to claim 6, wherein a content ratio of the coating element in the positive electrode material is 100 ppm to 3000 ppm.

8. The positive electrode material according to claim 6, wherein a content ratio of the coating element in the positive electrode material is 200 ppm to 2000 ppm.

9. The positive electrode material according to claim 1, wherein powder resistivity p of the positive electrode material under 12 MPa is 10 Ω·cm to 4500 Ω·cm.

10. The positive electrode material according to claim 9, wherein the powder resistivity p is 1000Ω·cm to 4000Ω·cm.

11. The positive electrode material according to claim 1, wherein in residual lithium on the surface of the positive electrode material, $Li_2CO_3$ content is less than 3000 ppm, and LiOH content is less than 5000 ppm.

12. The positive electrode material according to claim 11, wherein the $Li_2CO_3$ content is less than the LiOH content.

13. The positive electrode material according to claim 1, wherein a Li/Ni mixing ratio of the positive electrode material is 0.5% to 2%.

14. The positive electrode material according to claim 1, wherein when the positive electrode material is single crystal particles, MMS ranges from 0.03 to 0.07; and when the positive electrode material is secondary particles, MMS ranges from 0.07 to 0.20.

15. A positive electrode plate, comprising a positive electrode current collector and a positive electrode active material layer, wherein the positive electrode active material layer comprises the positive electrode material according to claim 1.

16. An electrochemical energy storage apparatus, comprising the positive electrode material according to claim 1.

* * * * *